United States Patent [19]

Miller et al.

[11] Patent Number: 5,639,033

[45] Date of Patent: Jun. 17, 1997

[54] INSULATION BLOWER HAVING HANDS-FREE METERED FEEDING

[76] Inventors: Kerry W. Miller, 404 W. Central Ave., Bluffton, Ind. 46714; Michael W. Miller, 9920 N. 100 W., Markle, Ind. 46770

[21] Appl. No.: 710,100

[22] Filed: Sep. 11, 1996

[51] Int. Cl.⁶ .................. B02C 13/286; B02C 18/22; B02C 21/02; B02C 23/18

[52] U.S. Cl. .................. 241/57; 241/60; 241/101.4; 241/101.78; 241/101.8; 241/162

[58] Field of Search .................. 241/57, 60, 101.4, 241/101.78, 101.8, 162, 199.12, 605; 406/63, 66, 67, 68

[56] References Cited

U.S. PATENT DOCUMENTS

| | | | |
|---|---|---|---|
| 1,568,139 | 1/1926 | Dewey | 406/66 |
| 2,193,849 | 3/1940 | Whitfield | 406/63 X |
| 2,262,094 | 11/1941 | Burt | 406/66 |
| 2,665,852 | 1/1954 | Shively | 241/92 |
| 4,025,122 | 5/1977 | Diemart | 302/49 |
| 4,376,600 | 3/1983 | Egli | 406/63 |
| 4,560,307 | 12/1985 | Deitesfeld | 406/63 |
| 4,599,015 | 7/1986 | Krambrock | 406/66 |
| 4,640,467 | 2/1987 | Takeuchi | 241/282.1 X |
| 5,071,289 | 12/1991 | Spivak | 406/11 |
| 5,511,730 | 4/1996 | Miller et al. | 241/57 |

Primary Examiner—John M. Husar
Attorney, Agent, or Firm—Woodard, Emhardt, Naughton, Moriarty & McNett

[57] ABSTRACT

An insulation blower having hands-free metered feeding. Insulation is stripped from a supply bale and fed into a plurality of chambers of a rotating chamber wheel. The rate at which insulation is fed into the chambers is metered by a feeder assembly which eats through the bale. As the filled chambers sequentially pass through an air lock, the insulation therein is blown out of a lower airlock port and into a delivery tube. Air from a blower is introduced into the airlock through a metered airbox which allows adjustment of the amount of air delivered to the airlock and hence the rate of insulation blown through the delivery tube. Closing off the airbox completely causes air from the blower to enter the delivery tube directly (bypassing the airbox and airlock) in order to clear obstructions in the delivery tube.

21 Claims, 5 Drawing Sheets

INSULATION BLOWER HAVING HANDS-FREE METERED FEEDING

TECHNICAL FIELD OF THE INVENTION

The present invention generally relates to loose fill thermal insulation blowers, and in particular to a vertically oriented air lock type system with means for metering the rate at which pieces of thermal insulation are fed to the air lock.

BACKGROUND OF THE INVENTION

The present invention relates generally to loose fill thermal insulation blowers, and in particular to a vertically oriented air lock type system with means for metering the rate at which pieces of thermal insulation are fed to the air lock.

Loose fill thermal insulation blowers in use today generally fall into one of two categories, through-the-blower systems and air lock systems. In through-the-blower systems, the insulation bale must normally be torn apart by hand and then further ripped into relatively small pieces by agitating knives or fingers that are powered by the apparatus. The thermal insulation pieces are then fed into the suction side of a high-speed (10,000 rpm) centrifugal blower. The delivery of the thermal insulation material to the desired location is accomplished via a flexible hose connected to the outlet of the blower apparatus. The rate of delivery of insulation for through-the-blower systems is generally controlled by the size of the blower, the centrifugal impeller design, the amount of air allowed to enter at the suction air gate, and/or the amount of insulation allowed to enter at the suction material gate.

Such systems are normally very adaptable to different blowing situations such as attic blowing, wall cavity blowing, and wet adhesive spraying of insulation onto a free-standing surface; however, through-the-blower systems suffer from a number of disadvantages, not the least of which is that the system is generally maintenance intensive and requires relatively large amounts of power to operate. Because all delivered material must go through the centrifugal impeller of the blower, an operator may inadvertently feed rocks, dirt, metal particles, cloth, etc. which can potentially do extensive damage to the impeller. Even if no foreign material is introduced to the system, the wear of the impeller is rapid and a continual maintenance concern. Finally, through-the-blower systems simply cannot achieve the high delivery rates of insulation required by many users, such as by commercial contractors.

In air lock systems, the insulation bale is also first torn apart by hand, then further ripped apart by agitating knives or fingers, and finally is fed into a rotating air lock. The pressure side of the blower is connected to one side of the air lock, and a flexible delivery hose is connected to the other side to deliver the insulation to the desired location. The rate of delivery of insulation in air lock systems is generally controlled by changing the speed of rotation of the air lock, changing the speed of the blower, and/or by adjusting the amount of insulation material allowed to enter the air lock through the material gate. These systems usually have the capability of high delivery rates, which can be as high as 3,000 pounds of insulation per hour. However, air lock systems in present use do not generally adapt well to blowing in enclosed spaces, such as wall cavities, because the required small diameter delivery nozzle places too tight a restriction on the system. It is also difficult in air lock systems to deliver the required three pounds per cubic foot of packed density that is necessary in order to prevent insulation settling within the wall cavity. Air lock systems are also usually relatively heavy, are not very portable and generally have high initial costs. Insulation blow density for open insulation blowing, such as in attic spaces, is generally not as good as through-the-blower systems because the material is not being fluffed by the high velocity impeller of a blower.

What is needed is a low-weight thermal insulation blower that is sufficiently portable to easily fit through a standard doorway, has relatively low power requirements at full load conditions, requires no hand shredding, has the capability to deliver high material rates, and has the flexibility to work equally well in closed blowing situations, such as into walls, and opening attic-type blowing situations.

SUMMARY OF THE INVENTION

The present invention relates to an insulation blower having hands-free metered feeding. Insulation is stripped from a supply bale and fed into a plurality of chambers of a rotating chamber wheel. The rate at which insulation is fed into the chambers is metered by a feeder assembly which eats through the bale. As the filled chambers sequentially pass through an air lock, the insulation therein is blown out of a lower airlock port and into a delivery tube. Air from a blower is introduced into the airlock through a metered airbox which allows adjustment of the amount of air delivered to the airlock and hence the rate of insulation blown through the delivery tube. Closing off the airbox completely causes air from the blower to enter the delivery tube directly (bypassing the airbox and airlock) in order to clear obstructions in the delivery tube.

In one form of the invention, a thermal insulation blower is disclosed comprising a base frame; a vertical axle; a motor mounted on said frame and having a drive shaft attached to one end of said vertical axle; a hopper sized to receive a bale of thermal insulation attached to said frame; a rotating bale stripper positioned in said hopper and attached to said vertical axle; a blower attached to said frame; a rotating chamber wheel attached to said vertical axle beneath said rotating bale stripper, said wheel having a plurality of chambers distributed around said vertical axle that open upward toward said rotating bale stripper; a stationary air lock attached to said frame and including upper and lower walls sized to enclose at least one of said plurality of chambers and further having a pair of openings; an airbox attached to said frame such that said blower and one of said pair of openings of said air lock are in communication with an interior of said airbox; and a first conduit having one end connected to the other of said pair of openings.

In another form of the invention, a thermal insulation blower is disclosed comprising a base frame; a vertical axle; a motor mounted on said frame and having a drive shaft attached to one end of said vertical axle; a hopper sized to receive a bale of thermal insulation attached to said frame; a blower attached to said frame a rotating chamber wheel attached to said vertical axle, said wheel having a plurality of chambers distributed around said vertical axle that open upward to receive falling pieces of thermal insulation therein; a stationary air lock attached to said frame and including upper and lower walls sized to enclose at least one of said plurality of chambers and further having a pair of openings; means, positioned in said hopper above said rotating chamber wheel, for ripping a bail of thermal insulation into relatively small pieces and for metering the rate at which the small pieces are allowed to fall toward said rotating chamber wheel; an airbox attached to said frame such that said blower and one of said pair of openings of said air lock are in communication with an interior of said airbox; and a first conduit having one end connected to the other of said pair of openings.

In another form of the invention, a thermal insulation blower is disclosed comprising a base frame; a vertical axle; a motor mounted on said frame and having a drive shaft attached to one end of said vertical axle; a hopper sized to receive a bale of thermal insulation attached to said frame; a rotating bale stripper positioned in said hopper and attached to said vertical axle; a blower attached to said frame a rotating chamber wheel attached to said vertical axle beneath said rotating bale stripper, said wheel having a plurality of hampers distributed around said vertical axle that open upward toward said rotating bale stripper; a stationary air lock attached to said frame and including upper and lower walls sized to enclose at least one of said plurality of chambers and further having a pair of openings; a first conduit connecting said blower to one of said pair of openings of said air lock; a second conduit having one end connected to the other of said pair of openings; a space below said chamber wheels; a pipe formed in said chamber wheel, said pipe coupling said space and an interior of said hopper; and a third conduit coupling said blower to said space; wherein said space is pressurized by said blower, such that thermal insulation entering said space is forced through said pipe and into said hopper.

DETAILED DESCRIPTION OF THE PREFERRED EMBODIMENT

Figure 1:
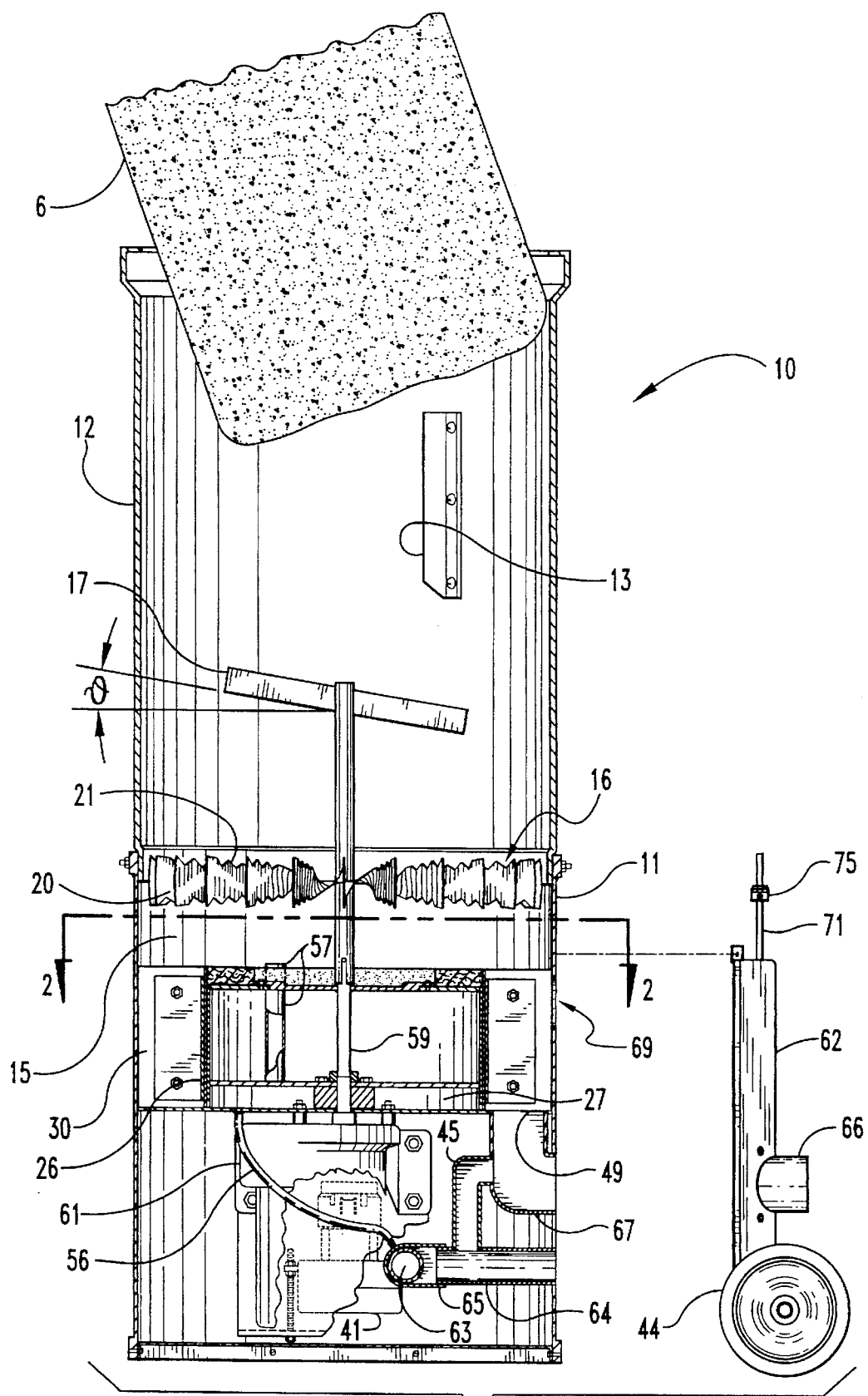
FIG. 1 is a partial cross-sectional side view of a thermal insulation blower according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present application is related to U.S. patent application Ser. No. 08/245,765 filed on May 18, 1994 now U.S. Pat. No. 5,511,730 by the present inventors and entitled INSULATION BLOWER HAVING HANDS-FREE METERED FEEDING, which said application is incorporated by reference herein in its entity.

Figure 2:
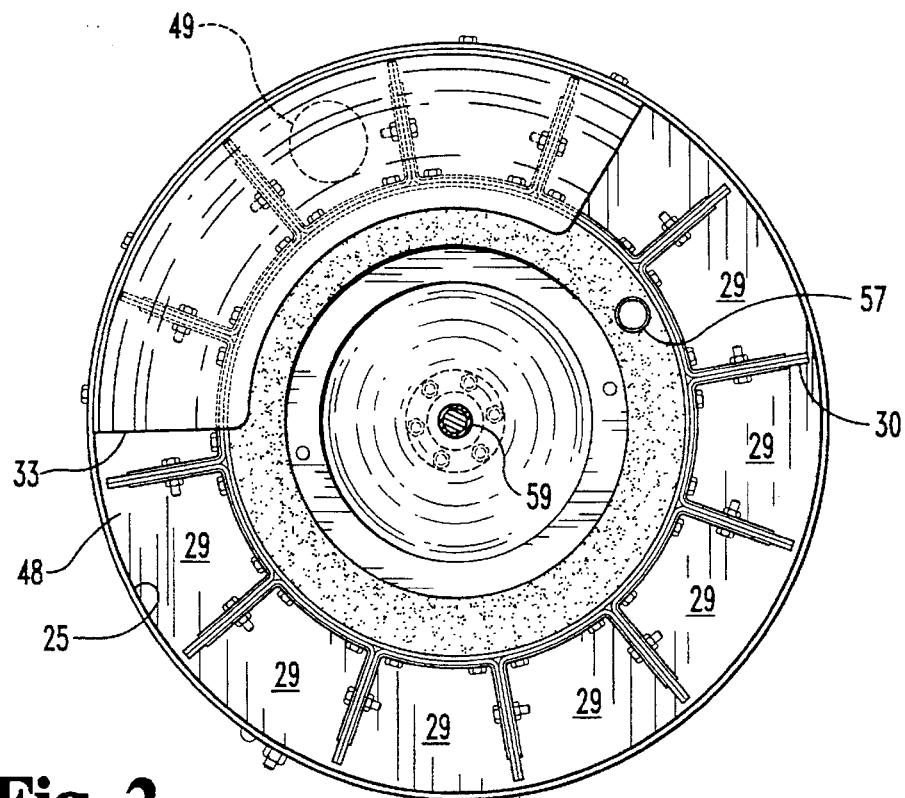
FIG. 2 is a top cross-sectional view through the insulation blower of FIG. 1 as viewed along the section arrows 2—2.

Referring now to FIGS. 1–2 a thermal insulation blower 10 according to the present invention includes a base frame 11 which is removably mounted a hopper 12. Both the base frame and the hopper are basically cylindrical in shape with a diameter just larger than that of a typical bale of thermal insulation 6 such that stationary vein 13 is able to prevent the bale 6 from rotating after being loaded into the hopper 12. Once within the hopper 12, the bale of thermal insulation 6 rests upon center post feeder bar 17, whereupon no further action need be taken by the person loading insulation bales into the blower. When the insulation blower 10 is turned on, a gear motor 61 simultaneously rotates a chamber wheel 26 and metering feeder assembly 16 via a vertical axle 59. Center post feeder bar 17 "eats" up through the center of the insulation bale 6 while stationary vein 13 prevents the bale from rotating. This allows the bale 6 to come into contact via gravity action with the stripper members 20, which peel pieces of insulation off of the bottom of the bale 6. Insulation pieces then fall by gravity directly into chambers 29 (FIG. 2) of rotating chamber wheel 26. The rate at which the bale 6 is fed onto the top serrated edges 21 of stripper members 20 is controlled by the angle $\theta$ of center post feeder bar 17 with respect to the horizontal. An angle $\theta$ of approximately 15° has been found to be preferable for most types of insulation bales.

As best seen in FIG. 2, rotating chamber wheel 26 consists of twelve equally sized chambers 29 that are distributed around the periphery thereof. Chambers 29 pass consecutively through a stationary air lock as the chamber wheel 26 rotates. The stationary air lock is made up of an air lock ceiling 33 and an air lock floor 48, which completely divides base frame 11 into an upper portion and a lower portion. As each consecutive chamber 29 rotates into registry with the air lock, the insulation pieces carried therein are blown from the chamber 29 via lower air lock opening 49 in the floor 48 (see FIG. 1). Air lock ceiling 33 is sized so that approximately 75% of the chambers 29 are always exposed to falling pieces of insulation from stripper members 20. This is in stark contrast to the horizontally oriented machines of the prior art that only permit a single chamber to be fully exposed to the falling material at any given time.

One advantage of multiple exposure is that a chamber 29 positioned approximately 180° from lower air lock opening 49 can be used to precisely set all machine variables for maximum efficiency. Maximum insulation delivery rate with the least energy occurs when the chambers 29 are filled approximately 180° from the lower air lock opening 49. Adjustment to achieve this optimum efficiency can be accomplished by changing the angle $\theta$ of center post feeder bar 17, by changing the rotation rate of the chamber wheel 26, or by changing the speed of blower 41 (see FIG. 1). Another advantage of the present multiple chamber exposure design over the single exposure horizontal air locks of the prior art is that the whole system can operate at lower speeds since there is more time for the chamber 29 to be filled. This results in less energy input being required by the blower apparatus 10. Still another advantage of multiple chamber exposure is that it lends itself to a more compact design which is beneficial in keeping overall weight and size of the machine to a minimum.

In order to further reduce the power requirements for insulation blower 10, gear motor 61 and its vertical drive shaft 59 are mounted to the underside of the air lock floor 48 a small offset distance from the geometric center of base frame 11 in the direction of the air lock opening 49. This results in chamber gaskets 30 of chambers 29 creating friction drag only when the chamber is passing under the air lock ceiling 33. In other words, gaskets 30 remain slightly out of contact with the inner wall 25 of base frame 11 through most of the chambers' rotation path. Not only does this offset mounting lower the overall energy required for the blower 10, but it also reduces gasket wear on chamber gaskets 30, which lowers long-term maintenance costs by increasing the operational lifetime of the gaskets 30.

In order for a multiple exposure air lock to work, it is mandatory that the insulation bale 6 be metered into the falling space 15 (FIG. 1) between stripper members 20 and rotating chamber wheel 26. For example, if too little material is metered to rotating chamber wheel 26, the unit will not be able to deliver enough thermal insulation material. If too much material is metered into falling space 15, the insulation pieces tend to become overly packed which often results in bridging problems and/or plugging problems that also serve to reduce delivery outputs.

Figure 6:
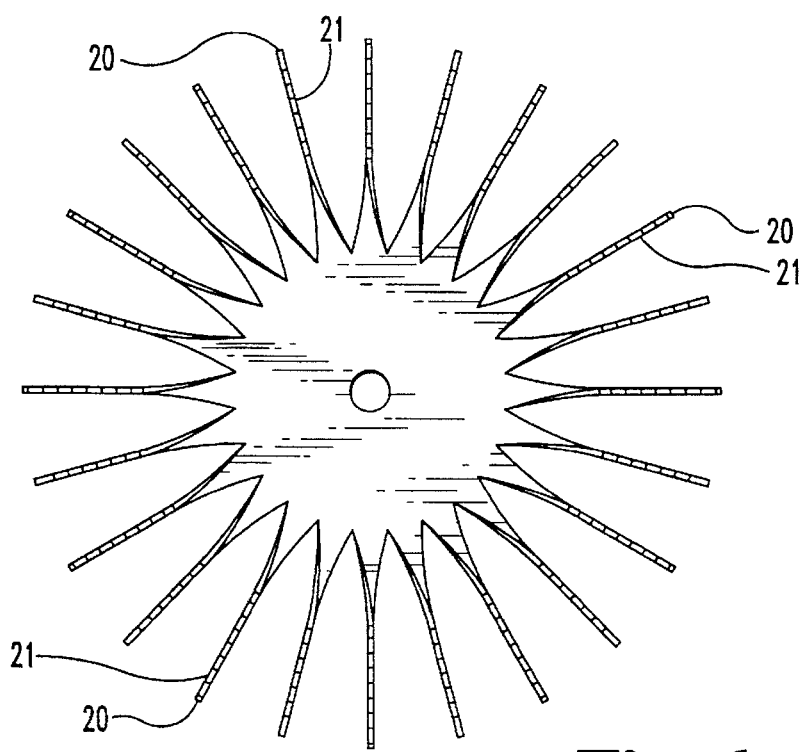
FIG. 6 is a top sectional view of the metering feeder assembly of FIG. 5 as viewed along arrows 6—6.
Figure 5:
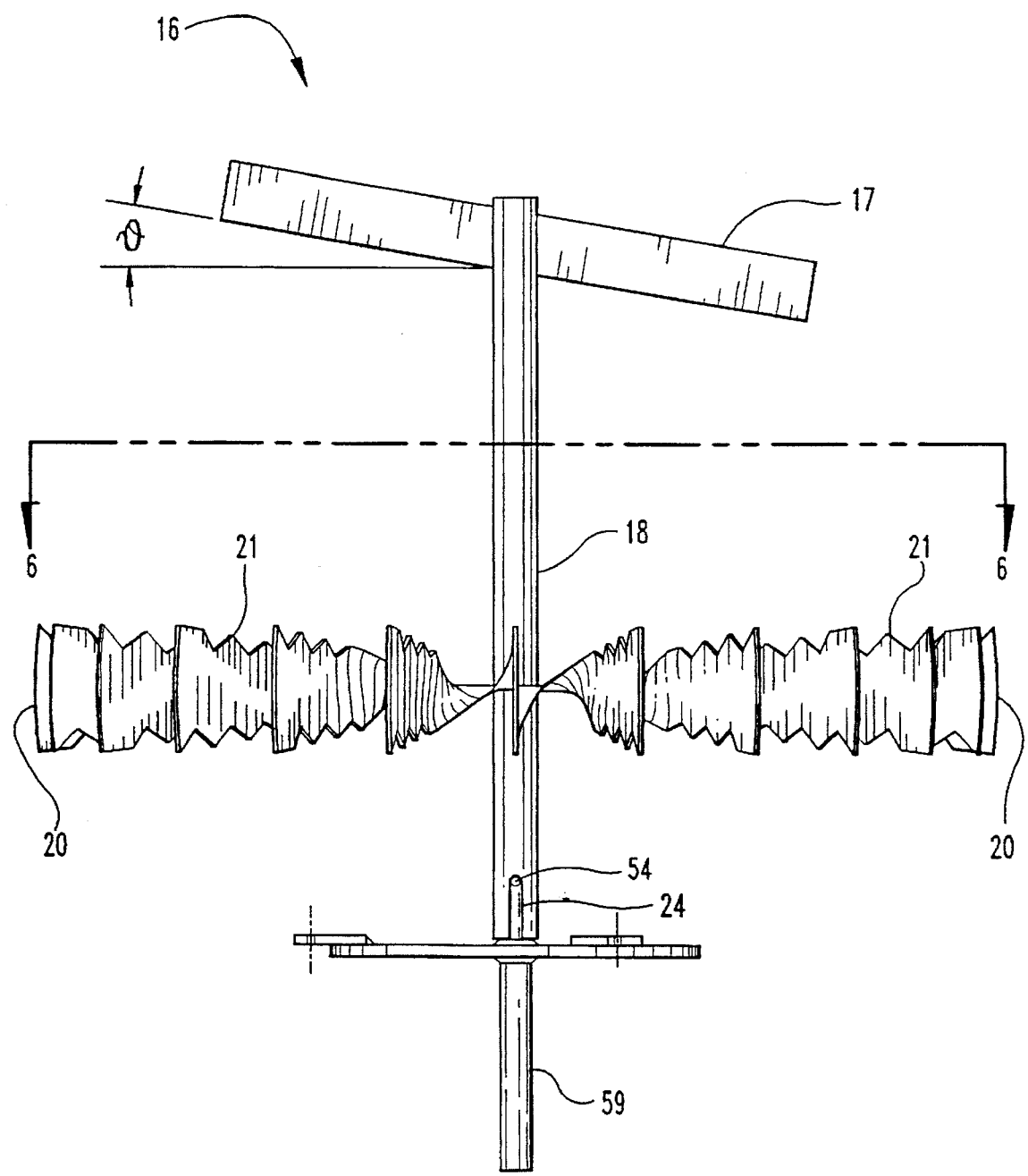
FIG. 5 is a side elevational view of a metering feeder assembly of the thermal insulation blower of the present invention.

The present invention accomplishes correct metering through the unique design of metering feeder assembly 16 as best shown in FIGS. 5 and 6. First, the angle θ of center post feeder bar 17 controls the maximum downfeed rate of the insulation bale 6. The greater the angle θ, the greater the feed rate of the bale 6 onto stripper members 20. Stripper members 20 comprise a plurality of radial arms which protrude from a common hub 18, with each stripper member having a serrated upper edge 21. The radial arms have a maximum separation distance at their radial extremes of approximately two to two and one-half inches. Thus, relatively large pieces of insulation having a dimension greater than the separation distance between the stripper members 20 are unable to pass through the stripper until being torn into smaller pieces. Another important feature of the present invention is that the tooth pattern on adjacent stripper members 20 is not identical so that the stripper members 20 do not simply cut grooves into the bottom of the insulation bale 6. The assembly is also preferably removable from the machine 10 to better facilitate cleaning in the area around rotating chamber wheel 26. Vertical shaft 18 of the assembly includes a drive slot 24 which meshes with a transverse drive pin 54 that is attached to vertical drive shaft 59 as shown in FIG. 5.

Figures 3, 3A:
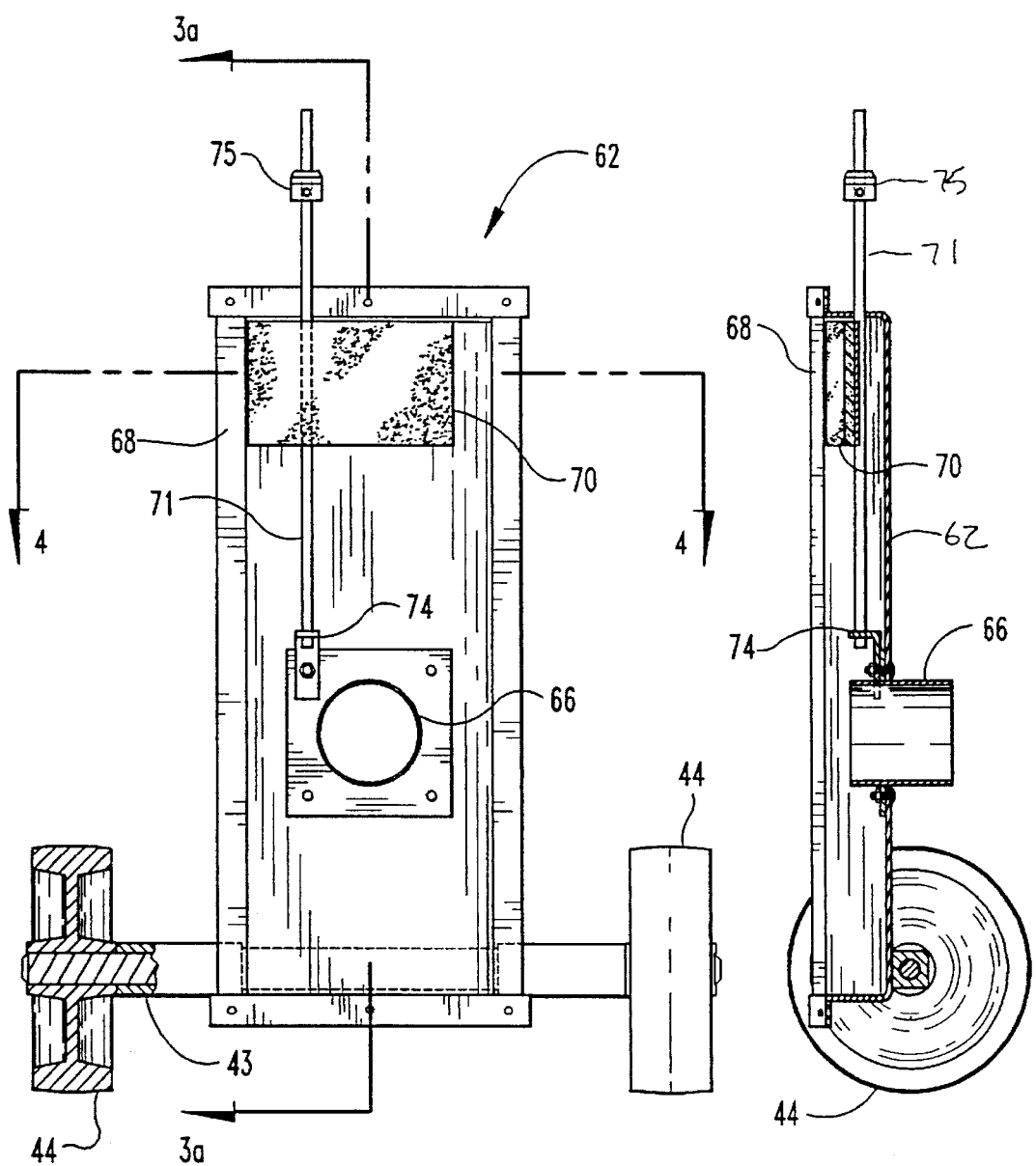
FIG. 3 is a partial cross-sectional front elevational view of a metered airbox of the insulation blower of FIG. 1.
FIG. 3a is a cross-sectional side view of the metered airbox of FIG. 3.

Referring once again to FIG. 1, the thermal insulation blower 10 includes a detachable metered airbox 62 which is used to direct and meter the air flow within the insulation blower 10. The metered airbox 62 is shown in alternative views in FIGS. 3, 3a and 4. The metered airbox 62 securely attaches to one side of the insulation blower 10 by means of a sealing gasket and suitable connectors (not shown). When the thermal insulation blower 10 is activated, the blower 41 produces an air stream at its exit 63 which is coupled to blower feed tube 64 via the 90° connection 65. Air exiting the blower 41 therefore enters the metered airbox 62 which is firmly attached to the side of insulation blower 10. The airbox 62 includes a pass-through tube 66 which sealingly engages one end of the tube 67, the other end of which is coupled to the lower air lock opening 49. Because the pass-through tube 66 is sealingly engaged with the tube 67, air entering the air box 62 via the blower feed tube 64 passes around the exterior of pass-through tube 66 and does not enter the tube 67. Instead, this air is forced to the top of the airbox 62 where it passes through an airbox opening 68 which is in communication with an upper air lock opening 69 in the base frame 11. The upper air lock opening 69 is formed in the side of the insulation blower 10 near the top of the air lock.

In operation, air exiting the blower 41 passes through the blower feed tube 64 into the airbox 62 where it passes around the pass-through tube 66 and exits the airbox opening 68. The air is then forced into the air lock through the upper air lock opening 69, thereby forcing insulation material within the air lock through the lower air lock opening 49, the tube 67 and finally out of the pass-through tube 66, which is attached to a suitable insulation delivery means, such as a flexible hose. As the gear motor 61 continues to rotate, the vertical shaft 59 causes rotation of both the metering feeder assembly 16 and the chamber wheel 26. This causes successive chambers 29 of the chamber wheel 26 to be filled with loose insulation material and sequentially brought into alignment with the air lock. As each successive chamber 29 is aligned with the air lock, forced air from the blower 41 entering the upper air lock opening 69 forces the loose insulation material within the chamber 29 downward through the lower air lock opening 49 and out of the pass-through tube 66.

Figure 4:
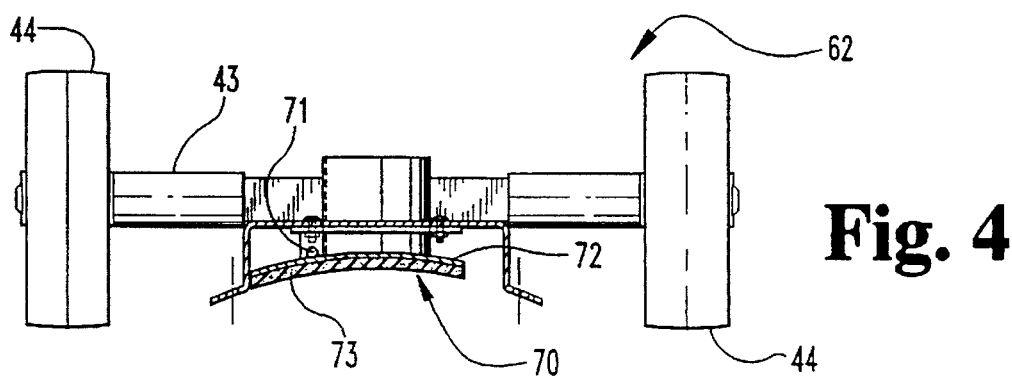
FIG. 4 is a top cross-sectional view of the metered airbox of FIG. 3.

The amount of air allowed to flow through the air box 62 (and hence into the upper air lock opening 69) may be metered by means of a sliding pad 70 mounted upon the rod 71. As best illustrated in FIG. 4, the sliding pad 70 comprises a backing plate member 72 covered by a resilient pad material 73, such as felt. In the position of the pad 70 illustrated in FIG. 3, the upper air lock opening 69 is completely covered by the pad 70, thereby preventing any airflow through the air lock. As the rod 71 is moved in a downward direction, the pad 70 is caused to also slide downward, thereby successively opening a greater portion of the upper air lock opening 69. The larger the percentage of upper air lock opening 69 which is exposed by the pad 70, the greater the amount of air forced through the air lock chamber, and hence the greater the delivery rate of insulation material through the pass-through tube 66. Therefore, by adjusting the vertical position of the rod 71, the insulation delivery rate of the blower 10 may be conveniently adjusted. The rod 71 is carried by an alignment bracket 74 and includes an adjustable stop 75 which may be moved along the rod 71 in order to fix the vertical position of the pad 70 at any desired location by means of interaction of the stop 75 with the upper surface of the air box 62. The air box 62 further includes an axle 43 carrying wheels 44 which allow the blower 10 to be conveniently moved from place to place.

In the event that the insulation delivery line attached to the pass-through tube 66 becomes clogged with insulation material, the pad 70 may be adjusted to its uppermost position, thereby completely blocking the upper air lock opening 69. In this position, air exiting the blower 41 is prevented from circulating through the air lock. This causes the air exiting the blower 41 to pass through the bypass tube 45 which directly couples the blower feed tube 64 to the tube 67. The air which is forced through the bypass tube 45 will clear the clogged line attached to the pass-through tube 66. Once the line has been cleared, the pad 70 may be returned to its original desired position. When the pad 70 is in the uppermost position, very little insulation material will be fed into the tube 67 (only that which falls by the force of gravity) therefore the air forced through the bypass tube 45 is very effective in clearing the clogged line.

Figure 7:
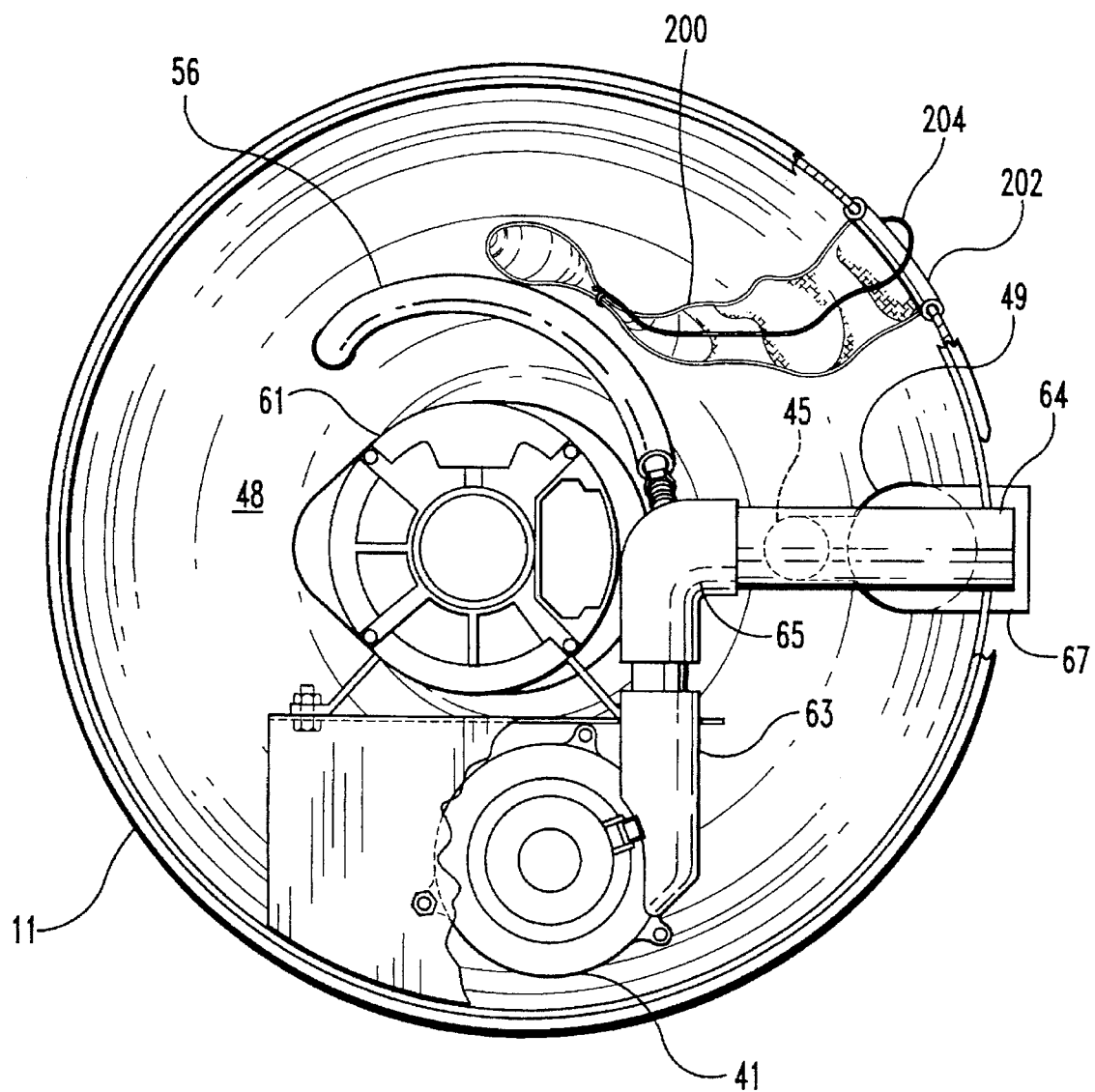
FIG. 7 is a bottom plan view of the insulation blower of FIG. 1.

Referring to FIGS. 1 and 7, a space 27 is provided below the chamber wheel 26 in order to capture insulation material which inadvertently bypasses the chamber wheel 26. If such insulation particles were allowed to collect in the space 27, it would eventually become full and therefore create a drag on the rotation of the chamber wheel 26. In order to prevent this, the pipe 57 is provided in the chamber wheel 26, wherein the ends of the pipe 57 place the space 27 in communication with the space 15 above the chamber wheel 26. Additionally, a hose 56 couples the compressed air within the tube 65 with the space 27. This has the effect of maintaining the space 27 under pressure, which operates to force any insulation material within the space 27 through the tube 57 and into the space 15. The tube 57 rotates in a circle about the shaft 59 at a fixed radius within the wheel 26. The top of the tube 57 is visible in the view of FIG. 2.

With continuing reference to FIG. 7, intake air is supplied to the blower 41 through a filter 200 which comprises, for example, a cylinder of nylon mesh closed at one end. An open end of the filter 200 is attached to a hole through the base frame 11 by means of a piece of rubber tubing 202 which is slit longitudinally and used to couple the filter 200 to the opening and the base frame 11. A cord 204 is coupled to the filter 200 near its closed end and brought through the opening in the base frame 11 and secured to the outside of the blower 10. The cord 204 may thereafter be used to conveniently pull the filter 200 from the interior of the blower 10 in order to clean out particles trapped by the filter 200.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A thermal insulation blower comprising:
   a base frame;
   a vertical axle;
   a motor mounted on said frame and having a drive shaft attached to one end of said vertical axle;
   a hopper sized to receive a bale of thermal insulation attached to said frame;
   a rotating bale stripper positioned in said hopper and attached to said vertical axle;
   a blower attached to said frame;
   a rotating chamber wheel attached to said vertical axle beneath said rotating bale stripper, said wheel having a plurality of chambers distributed around said vertical axle that open upward toward said rotating bale stripper;
   a stationary air lock attached to said frame and including upper and lower walls sized to enclose at least one of said plurality of chambers and further having a pair of openings;
   an airbox attached to said frame such that said blower and one of said pair of openings of said air lock are in communication with an interior of said airbox; and
   a first conduit having one end connected to the other of said pair of openings.

2. The thermal insulation blower of claim 1, wherein said blower is additionally coupled to an interior of said first conduit.

3. The thermal insulation blower of claim 1, further comprising a metering device coupled to said airbox and operative to meter an amount of airflow between said airbox and said one of said pair of openings.

4. The thermal insulation blower of claim 3, wherein said metering device comprises a sliding pad operative to cover a portion of said one of said pair of openings.

5. The thermal insulation blower of claim 1, further comprising:
   a space below said chamber wheel;
   a pipe formed in said chamber wheel, said pipe coupling said space and an interior of said hopper; and
   a second conduit coupling said blower to said space;
   wherein said space is pressurized by said blower, such that thermal insulation entering said space if forced through said pipe and into said hopper.

6. The thermal insulation blower of claim 1 further comprising means, attached to said hopper, for inhibiting rotation of a bale of thermal insulation received in said hopper.

7. The thermal insulation blower of claim 1 wherein a majority of said plurality of chambers are always open to receive pieces of thermal insulation when said rotating chamber wheel is rotated by said vertical axle.

8. The thermal insulation blower of claim 1 wherein said rotating bale stripper includes a stripper having a plurality of serrated spoke members extending radially outward from said vertical axle and a center post feeder attached to said vertical axle above said stripper; and
   wherein said center post feeder is sized and shaped to bore upwardly through a bale of thermal insulation placed in said hopper when said vertical axle is rotating.

9. The thermal insulation blower of claim 8 wherein said center post feeder is a bar attached to the other end of said vertical axle at an adjustable angle with respect to a horizontal reference line.

10. A thermal insulation blower comprising:
    a base frame;
    a vertical axle;
    a motor mounted on said frame and having a drive shaft attached to one end of said vertical axle;
    a hopper sized to receive a bale of thermal insulation attached to said frame;
    a blower attached to said frame
    a rotating chamber wheel attached to said vertical axle, said wheel having a plurality of chambers distributed around said vertical axle that open upward to receive falling pieces of thermal insulation therein;
    a stationary air lock attached to said frame and including upper and lower walls sized to enclose at least one of said plurality of chambers and further having a pair of openings;
    means, positioned in said hopper above said rotating chamber wheel, for ripping a bail of thermal insulation into relatively small pieces and for metering the rate at which the small pieces are allowed to fall toward said rotating chamber wheel;
    an airbox attached to said frame such that said blower and one of said pair of openings of said air lock are in communication with an interior of said airbox; and
    a first conduit having one end connected to the other of said pair of openings.

11. The thermal insulation blower of claim 10, wherein said blower is additionally coupled to an interior of said first conduit.

12. The thermal insulation blower of claim 10, further comprising a metering device coupled to said airbox and operative to meter an amount of airflow between said airbox and said one of said pair of openings.

13. The thermal insulation blower of claim 12, wherein said metering device comprises a sliding pad operative to cover a portion of said one of said pair of openings.

14. The thermal insulation blower of claim 10, further comprising:

a space below said chamber wheel;

a pipe formed in said chamber wheel, said pipe coupling said space and an interior of said hopper; and a second conduit coupling said blower to said space;

wherein said space is pressurized by said blower, such that thermal insulation entering said space is forced through said pipe and into said hopper.

15. The thermal insulation blower of claim 10 wherein said means for ripping and metering includes a plurality of serrated stripper members extending radially outward from said vertical axle, and further includes means for controlling the rate at which a bale of thermal insulation placed in said hopper is fed to said stripper wheel.

16. The thermal insulation blower of claim 15 wherein said means for controlling includes a center post feeder attached to said vertical axle above said stripper members; and wherein said center post feeder is sized and shaped to bore upwardly through a bale of thermal insulation placed in said hopper when said vertical axle is rotating.

17. The thermal insulation blower of claim 16 wherein said center post feeder is a bar attached crosswise to said vertical axle; and said means for controlling includes means for adjusting the angular orientation of said bar with respect to a horizontal reference line.

18. A thermal insulation blower comprising:

a base frame;

a vertical axle;

a motor mounted on said frame and having a drive shaft attached to one end of said vertical axle;

a hopper sized to receive a bale of thermal insulation attached to said frame;

a rotating bale stripper positioned in said hopper and attached to said vertical axle;

a blower attached to said frame a rotating chamber wheel attached to said vertical axle beneath said rotating bale stripper, said wheel having a plurality of hampers distributed around said vertical axle that open upward toward said rotating bale stripper;

a stationary air lock attached to said frame and including upper and lower walls sized to enclose at least one of said plurality of chambers and further having a pair of openings;

a first conduit connecting said blower to one of said pair of openings of said air lock;

a second conduit having one end connected to the other of said pair of openings;

a space below said chamber wheel;

a pipe formed in said chamber wheel, said pipe coupling said space and an interior of said hopper; and a third conduit coupling said blower to said space;

wherein said space is pressurized by said blower, such that thermal insulation entering said space is forced through said pipe and into said hopper.

19. The thermal insulation blower of claim 18, wherein said first conduit comprises a metered airbox.

20. The thermal insulation blower of claim 19, wherein said metered airbox includes a sliding pad operative to cover a portion of said one of said pair of openings.

21. The thermal insulation blower of claim 18, wherein said blower is additionally coupled to an interior of said second conduit.

* * * * *